March 5, 1963
W. H. BROLIN
3,080,006
ICE CUTTING APPARATUS
Filed Oct. 7, 1960
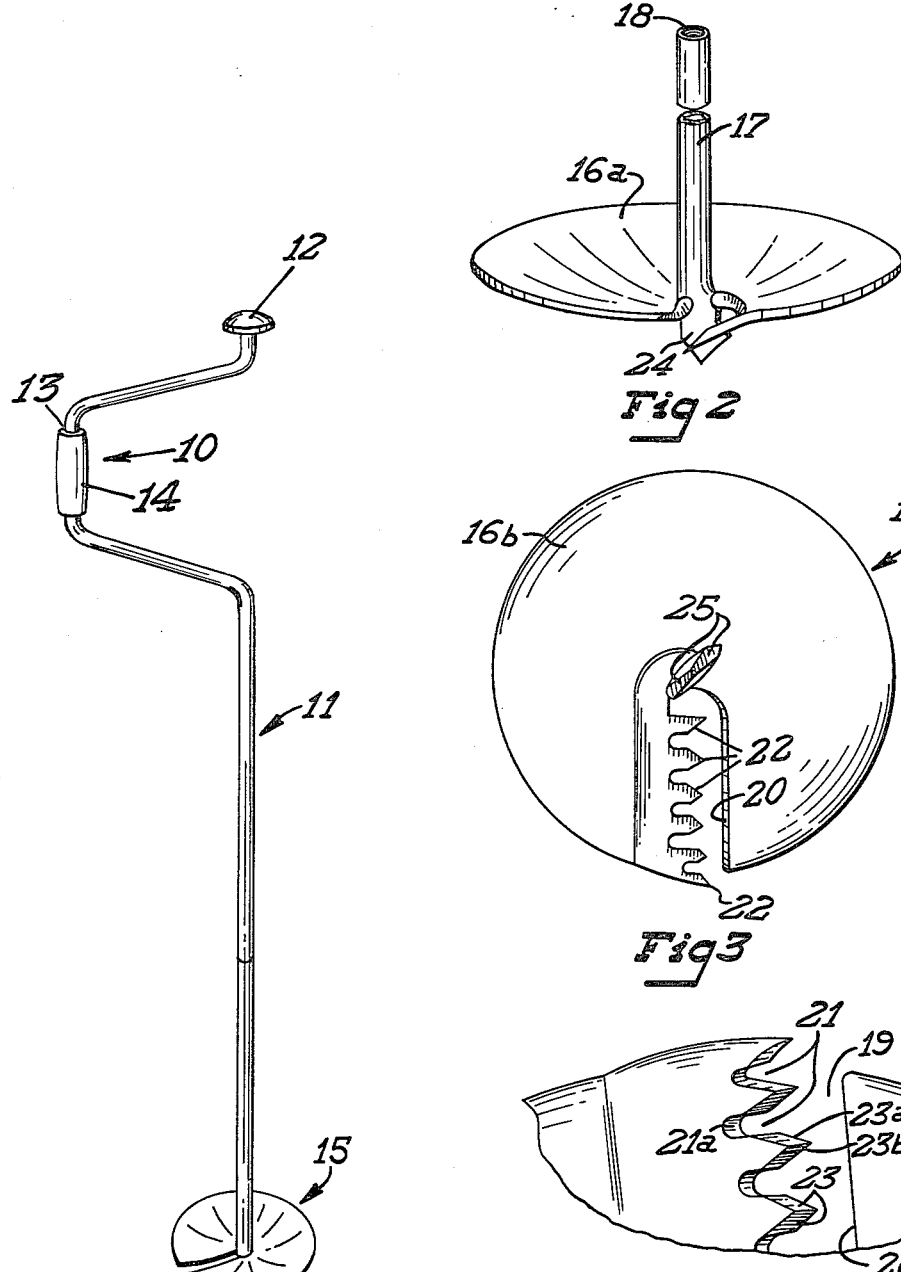
INVENTOR.
WALTER BROLIN
BY Williamson & Palmatier
ATTORNEYS

3,080,006
ICE CUTTING APPARATUS
Walter H. Brolin, Ortonville, Minn.
Filed Oct. 7, 1960, Ser. No. 61,120
2 Claims. (Cl. 175—18)

This invention relates to apparatus for cutting holes in a relatively hard surface and more particularly to apparatus for cutting holes in ice.

A general object of this invention is to provide a novel apparatus, of simple and inexpensive construction, for cutting holes of sufficient size in ice in preparation for ice fishing.

Another object of this invention is to provide a novel and improved rotary type cutting blade of disc-shaped configuration and having a radial slot formed therein, the slot having a plurality of teeth projecting therefrom and below the lower surface of the blade so that the ice will be readily cut and urged upwardly through the slot upon the blade during rotation of the latter for continuous removal of the ice.

A further object of this invention is to provide a novel and improved rotary cutting blade having its serrated slot formed therein and defining a plurality of cutting teeth for readily cutting a hole in the ice, the outermost of the teeth being positioned outwardly of the periphery of the blade to thereby serve as a reaming tooth for reaming partially closed ice holes.

Another object of this invention is to provide a novel and improved rotary cutting apparatus for cutting holes in ice and including a rotary disc-shaped blade and a handle for rotating the blade, the cutting apparatus functioning in a more efficient manner than any heretofore known comparable apparatus.

These and other objects and advantages of my invention will more fully appear from the following description made in connection with the accompanying drawing wherein like character references refer to the same or similar parts throughout the several views and in which:

FIG. 1 is a perspective view of my invention;

FIG. 2 is a perspective view on an enlarged scale of the rotary blade;

FIG. 3 is a bottom plan view of a rotary blade being illustrated on the same scale as FIG. 2; and FIG. 4 is a fragmentary top plan view on a greatly enlarged scale of the outermost teeth of the rotary cutting blade.

Referring now to the drawings and more specifically to FIG. 1, it will be seen that my cutting apparatus designated by the reference numeral 10 includes an elongate handle 11, the latter terminating at one end in an enlarged substantially flat knob 12. Handle 11 is also provided with an offset crank portion 13 which is suitably covered with a covering material 14. Handle 11 is adapted to be rotated about its longitudinal axis and it will be seen that rotation of the handle 11 is facilitated by the crank portion 13 and the gripping or grasping knob 12.

My novel cutting apparatus 10 also includes a rotary cutting blade 15 which, as best seen in FIG. 2, is comprised of a generally circular cutting member 16. It will be seen that the cutting member 16 is provided with a concave upper surface 16a and a convex lower surface 16b. The member is of disc-shaped form or of inverted, shallow conical configuration. The rotary cutting blade 15 also includes an elongate shank 17 integrally formed therewith and extending upwardly from the concave upper surface 16a. This elongate shank 17 extends upwardly from the center portion of the rotary cutting blade 15 and terminates upwardly in a threaded recess 18 which is adapted to be threadedly engaged by a mating threaded end at the lower terminal portion of the elongate handle 11.

The circular cutting member 16 is provided with a radial recess or slot 19 extending from substantially the center thereof outwardly to the periphery of the blade. It will be noted that this radially extending slot 19 defines a leading lip 20 and a trailing or cutting lip 21, as best seen in FIGS. 3 and 4. The trailing or cutting lip 21 is provided with a plurality of teeth 22 which, as best seen in FIG. 2, extend forwardly and downwardly therefrom. It will be noted that these teeth 22 actually project downwardly beyond the lower convex surface 16b, and each tooth 22 has oppositely beveled front surfaces or faces 23 which converge upwardly, as best seen in FIG. 4. Referring again to FIG. 4, it will be noted that these beveled surfaces 23 on each tooth actually define a forwardly converging lower cutting edge 23a and a leading inclined cutting edge 23b. It will also be noted that the portions between each of the teeth 22 are downwardly inclined to define a cutting edge 21a which cooperates with the lower cutting edges 23a and 23b of each of the teeth so that the cutting lip 21 is an almost continuous cutting surface. It should be pointed out that the rotary cutting blade 15 is preferably formed of a hard, metallic material such as plow steel to withstand the stresses set up during the cutting action of my apparatus.

The outermost of the cutting teeth 22, as best seen in FIG. 4, is positioned radially outwardly beyond the peripheral edge portions immediately adjacent the cutting teeth so that this outermost tooth in effect defines a reaming tooth. This is extremely important when it is desirable to ream a previously cut hole in the ice which is partially frozen. As it is well known in the art, holes in the ice tend to freeze inwardly and none of the prior art devices have provision for reaming a previously cut but partially frozen hole in the ice.

My rotary cutting blade 15 is also provided with a leading point 24 which extends axially from the lower concave surface 16b thereof, as best seen in FIGS. 2 and 3. It will be noted that this leading point 24 extends axially from the center of the lower concave surface 16b and is provided with oppositely beveled surfaces 25, clearly illustrated in FIG. 3, which converge downwardly to a point. The leading point 24 permits the rotary cutting blade to bite and hold in the ice during the initial rotation of the cutting apparatus.

During the operation of my apparatus, the elongate handle 11 will have been separated from the rotary cutting blade 15 to facilitate carrying of the cutting apparatus. The user will then quickly assemble the parts by screwing the threaded lower terminal portion of the elongate handle 11 into the threaded recess 18 of the shank 17. The operator will then position the cutting apparatus 10 in the desired spot in which the hole is to be cut through the ice. The crank portion 13 and the enlarged gripping knob 12 facilitate rotation of the cutting apparatus about its elongate axis and it will be seen that when the handle 11 is rotated, the rotary cutting blade 15 will be rotated therewith. During rotation of the cutting blade 15, the leading point 24 will penetrate the ice and bite and retain the apparatus during the initial steps of the cutting operation. Thereafter, the teeth 22 which project downwardly and forwardly below the convex lower surface 16b will bite through the ice and the ice chips will be constantly and continuously urged upwardly upon the upper concave surface 16a. With this arrangement the cut ice will be maintained upon the upper concave surface 16a so that in effect a core of chipped ice will be positioned thereon during the cutting operation. This prevents any of the chipped ice from falling in the hole or otherwise interfering with the cutting action of my cutting apparatus. The handle 11 will be rotated until the hole is cut through the ice in preparation for ice fishing then the cutting blade may be readily withdrawn with the core of ice positioned thereupon.

It is also pointed out that quite often ice fishermen return to the same fishing holes which ice fishing holes may be partially frozen over. As pointed out above, the hole will freeze from the circumferential outer surfaces thereof inwardly and my novel cutting apparatus 10 is especially adaptable for reaming partial frozen holes. To this end, it will be seen that rotation of the cutting apparatus positioned in cutting relation with a partially frozen cutting hole will ream the hole by the action of the outermost of the cutting teeth 22. Thus, it will be seen that a partially frozen ice hole may be quickly reamed by my novel cutting apparatus.

It will be noted from the above description that I have provided a novel cutting apparatus including a rotary cutting blade which is arranged and constructed to cause the chipped or cut ice to be positioned upon the cutting apparatus in core fashion so that there is no interference with the cutting operation by the cut ice.

It will also be noted from the preceding paragraphs that my novel cutting apparatus is provided with uniquely arranged cutting teeth which readily cut and convey the chipped ice upwardly upon the blade in a continuous fashion during rotation of the cut blade.

It will also be seen that with my novel cutting apparatus, a partially frozen ice hole may be quickly reamed which reaming operation could not be done by any prior art devices.

Thus, it will be seen that I have provided a novel cutting apparatus which is not only of simple and inexpensive construction but functions in a more efficient manner than any heretofore known comparable devices.

It will of course, be understood that various changes may be made in the form, details, arrangement and proportions of the various parts without departing from the scope of my invention.

What I claim is:

1. A rotary cutting blade for use in cutting holes in ice comprising a dish-shaped circular member adapted to rotate about its center and having a concave upper surface and having a convex lower surface, said dish-shaped member having a radially extending recess formed therein and extending radially outwardly from substantially the center of said member to the periphery thereof and defining a radially extending cutting lip, said cutting lip having a plurality of spaced apart teeth integrally formed therewith and extending downwardly and forwardly therefrom, each of said cutting teeth having upwardly converging front faces to thereby define a pointed cutting edge, the spacing between adjacent of said teeth being of generally arcuate configuration having a sharpened cutting edge cooperating with the pointed cutting edge of the teeth to present a substantially continuous cutting edge, the outermost of said teeth being positioned radially and outwardly beyond the preceding peripheral portion of said circular member to thereby define a reaming tooth for reaming an opening in the ice, a cutting point rigidly connected with said convex lower surface of said dish-shaped member and extending axially downwardly from the substantial center thereof and said cutting point having oppositely beveled surfaces to define a pair of downwardly converging cutting edges.

2. The structure as defined in claim 1 and an elongate shank rigidly connected with and extending axially upwardly from substantially the center of said upper concave surface.

References Cited in the file of this patent
UNITED STATES PATENTS

| | | |
|---|---|---|
| 260,798 | Stephenson | July 11, 1882 |
| 1,013,823 | Sheldon | Jan. 2, 1912 |
| 1,099,379 | Keenan | June 4, 1914 |
| 2,393,282 | Berlin | Jan. 22, 1946 |
| 2,476,047 | Kidder | July 12, 1949 |
| 2,860,855 | Vincent | Nov. 18, 1958 |
| 2,893,695 | Gerlikowski | July 7, 1959 |

FOREIGN PATENTS

| | | |
|---|---|---|
| 5,463 | Great Britain | July 7, 1900 |
| 377,460 | Germany | June 19, 1923 |